(12) United States Patent
Haselbach

(10) Patent No.: US 6,817,833 B2
(45) Date of Patent: Nov. 16, 2004

(54) TURBINE BLADE OF A GAS TURBINE WITH AT LEAST ONE COOLING EXCAVATION

(75) Inventor: Frank Haselbach, Stahnsdorf (DE)

(73) Assignee: Rolls-Royce Deutschland Ltd & Co KG, Dahlewitz (DE)

(*) Notice: Subject to any disclaimer, the term of this patent is extended or adjusted under 35 U.S.C. 154(b) by 0 days.

(21) Appl. No.: 10/231,187

(22) Filed: Aug. 30, 2002

(65) Prior Publication Data

US 2003/0152460 A1 Aug. 14, 2003

(30) Foreign Application Priority Data

Sep. 3, 2001 (DE) .......................... 101 43 153

(51) Int. Cl.⁷ .................................... F01D 5/18
(52) U.S. Cl. .................................... 416/97 R
(58) Field of Search .................. 415/115; 416/97 R

(56) References Cited

U.S. PATENT DOCUMENTS

| | | | |
|---|---|---|---|
| 3,672,787 A | * | 6/1972 | Thorstenson ............. 416/97 R |
| 4,705,455 A | | 11/1987 | Sahm et al. |
| 5,685,971 A | | 11/1997 | Schroder et al. |
| 5,941,686 A | | 8/1999 | Gupta et al. |
| 6,004,100 A | | 12/1999 | Przirembel et al. |
| 6,129,515 A | | 10/2000 | Soechting et al. |
| 6,234,755 B1 | * | 5/2001 | Bunker et al. ............. 416/97 R |
| 6,243,948 B1 | | 6/2001 | Lee et al. |
| 6,254,333 B1 | | 7/2001 | Merry |
| 6,375,425 B1 | * | 4/2002 | Lee et al. ................. 416/97 R |

FOREIGN PATENT DOCUMENTS

| | | |
|---|---|---|
| EP | 1174587 | 1/2002 |
| EP | 1262631 | 12/2002 |
| JP | 8-334003 | 12/1996 |
| JP | 10-89005 | 4/1998 |

OTHER PUBLICATIONS

German Search Report May 23, 2002.

* cited by examiner

Primary Examiner—Ninh H. Nguyen
(74) Attorney, Agent, or Firm—Harbin, King & Klima

(57) ABSTRACT

The invention relates to a turbine blade of a gas turbine with at least one cooling excavation 2 which connects an interior 3 and the surface 4 of the turbine blade 1, characterized in that a mouth 5 of the cooling excavation 2 is provided with a protrusion 6 in its downstream area.

18 Claims, 1 Drawing Sheet

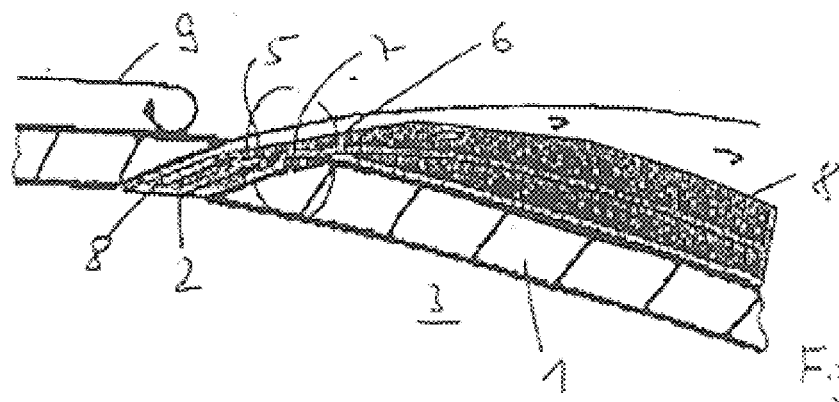
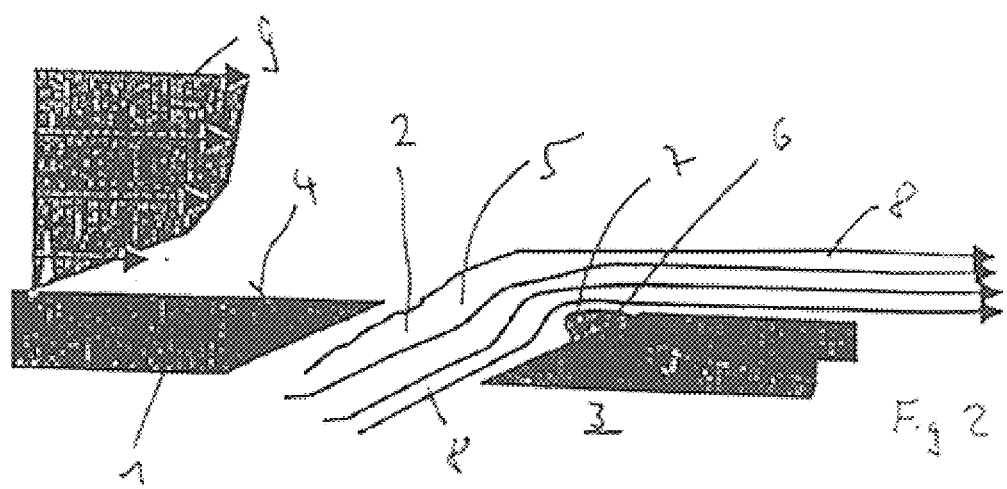
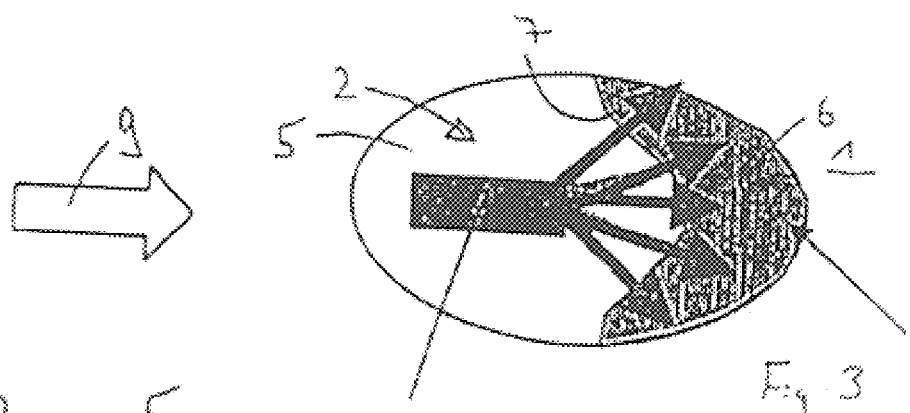
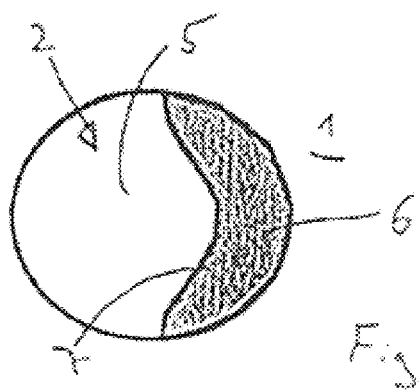

TURBINE BLADE OF A GAS TURBINE WITH AT LEAST ONE COOLING EXCAVATION

This application claims priority to German Patent Application DE10143153.8 filed Sep. 3, 2001, which application is incorporated by reference herein.

This invention relates to a turbine blade in accordance with the generic part of claim 1.

In particular, this invention relates to a turbine blade of a gas turbine with at least one cooling excavation which connects an interior of the turbine blade and its surface.

Various designs of turbine blades of said type are known in the state-of-the-art. U.S. Pat. Nos. 6,004,100, 6,129,515, 6,243,948, 6,254,333 or 5,685,971, for example, describe various embodiments of turbine blades. These may be designed as both stator blades or rotor blades. Common to these turbine blades is an interior into which cooling air is introduced. The cooling air flows through at least one cooling excavation to the surface of the turbine blade and forms a cooling film to cool the turbine blade and to protect it against damage by hot process gases.

The process efficiency of gas turbines (aero gas turbines or stationary gas turbines) can be improved by increasing the pressure ratio or the turbine inlet temperature as the only means left. Since the turbine inlet temperature (peak process temperature) may already nowadays exceed the melting temperature of the materials used for the turbine blades, efficient cooling methods are absolutely necessary at least for the first stage of a high-pressure turbine (stator blades or rotor blades). This includes the afore-mentioned film cooling, cf. the initially cited U.S. Specifications, for example.

As already mentioned, the cooling air is issued via slots or holes at the profile surface of the turbine blade, thereby forming a cooling film which covers and protects the blade profile.

For efficient cooling, various designs of such excavation or bore geometries are described in the associated state-of-the-art. These are previously known as slots, straight holes, fan-shaped openings, laid-back or fan-shaped-laid back holes. All these geometries are intended to achieve maximum cooling efficiency (high film cooling efficiency) with minimum aerodynamic losses.

A disadvantage of the state-of-the-art lies in the fact that frequently an efficient cooling film will only re-attach to the surface of the turbine blade or build up to a continuous layer at a certain distance downstream of the mouth of the cooling excavation. This distance may be two or three times the diameter of the mouth. The cooling flow so introduced may also mix disadvantageously with the external flow, which will increase the gas temperature in the near-wall area. This again has a negative effect on the cooling efficiency. A further disadvantage lies in the fact that the required exit angles of the cooling excavations (usually between 30° and 50° relative to the surface of the turbine blade) cause the cooling air film to lift off under certain circumstances. Again, this entails severe aerodynamic losses and a poor cooling efficiency. This effect is particularly pronounced with common parallel holes beyond blow-out ratios of 1, in which case the blown-in film initially lifts off from the surface of the turbine blade and is re-attached to it only at a downstream distance of no less than two to three mouth diameters. To remedy these problems, so-called fan-shaped film-cooling holes were suggested which maintain a film cooling efficiency of more than 0.3 at higher blow-out rates (ratio 1). However, the production of such fan-shaped film-cooling holes incurs high technical effort.

A further disadvantage lies in the fact that the film-cooling holes (cooling excavations) form so-called kidney-shaped swirls whose structure disadvantageously causes the cooling air to rapidly mix with the hot external flow at the mouth (exit) or transports this high-temperature flow to the surface of the turbine blade, respectively.

A broad aspect of the present invention is to provide a development of a turbine blade of the initially cited type which combines simple design and easy, cost-effective manufacture with efficient cooling of the surface of the turbine blade.

It is a particular object of the present invention to provide remedy for the above problems by the features cited in claim 1, with further advantages becoming apparent from the sub-claims.

Accordingly, this invention provides for a protrusion in the downstream region of the mouth of the cooling excavation.

The turbine blade in accordance with this invention is characterized by a variety of merits.

The provision of a protrusion in the downstream region of the mouth of the cooling excavation enables the cooling flow to be attached very effectively to the surface of the turbine blade as it exits from the mouth of the cooling excavation. Thus, an improved, low-loss deflection of the cooling air is achieved. Also, the formation of a cooling film at the surface of the turbine blade is promoted.

A further advantage lies in the fact that the surface of the turbine blade is generally wetted very effectively and efficiently with a cooling film of the cooling flow.

A further advantage of the design according to the present invention is the reduction of the aerodynamic losses in the area of the film cooling air.

Thus, owing to the increased film cooling efficiency, a reduced cooling air consumption (process benefit) is achieved. Also, turbine efficiency is improved by reduced dilution losses.

Generally, the advantages allow the life of the turbine blades to be increased or the requirements on the material of the turbine blade to be reduced with the cooling air masses being constant.

In a preferred development of the present invention, the protrusion extends along a part of the circumference of the mouth. This feature allows the entire cooling air issued from the mostly oval mouth to be attached effectively to the surface of the turbine blade.

The protrusion is preferably kidney-shaped to become particularly efficient both at its central and at its marginal area.

It is particularly favorable to provide the protrusion with a rounded cross-sectional area which projects into the mouth.

The protrusion may either extend beyond or finish off with the surface of the turbine blade.

Generally, it is particularly favorable if the protrusion is made at the surface of the turbine blade so as to impart a Coanda effect to the flow issuing from the mouth. The Coanda effect relates to the property of fluids (water, gases etc.) to adhere to curved surfaces. The described design of the protrusion imparts this effect to the cooling air flow.

The present invention is more fully described in the light of the accompanying drawing showing a preferred embodiment. On the drawings, FIG. 1 is a schematic partial side view of a turbine blade with a cooling excavation and protrusion in accordance with the present invention, FIG. 2 is an enlarged schematic view of the representation in FIG. 1, FIG. 3 is a top view of a mouth design in accordance with the present invention, and FIG. 4 is a further representation similar to FIG. 3.

The Figures illustrate a partial area of a wall of a turbine blade 1. This features an interior 3 through which cooling air is passed. With regard to the geometry and design of the turbine blade, reference is made to the state-of-the-art, for example to the initially cited U.S. Specifications.

As shown in FIG. 1, the turbine blade 1 features at least one cooling excavation 2. Apparently, a plurality of such cooling excavations 2 is normally provided, these being arranged or patterned specifically. Location, size and design of the cooling excavations depend on the respective operating conditions and geometries of the turbine blades.

The cooling excavation 2 extends into the surface 4 of the turbine blade 1 with a mouth 5. In the area of the mouth 5, a protrusion 6 in accordance with the present invention is provided which preferably is kidney-shaped and extends over a circumferential area of the mouth 5, as illustrated in FIGS. 3 and 4. The protrusion 6 may preferably feature a cross-sectional area 7 projecting into the mouth 5 (cf. FIGS. 1 and 2).

The protrusion 6 is designed such that the cooling air flow 8 fed through the cooling excavation 2 is attached to the surface 4 of the turbine blade 1, as illustrated in FIG. 2, in particular.

Reference numeral 9 indicates a main flow which passes along the surface 4 of the turbine blade 1.

As a further advantage, the kidney-shaped, three-dimensional configuration of the protrusion reduces or avoids the occurrence of so-called kidney-shaped swirls which may arise with exiting jets and involve a disadvantageous drawing-in of hot gas.

A plurality of modifications may be made to the embodiment here shown without detracting from the inventive concept.

List of Reference Numerals

1 Turbine blade
2 Cooling excavation
3 Interior
4 Surface
5 Mouth
6 Protrusion
7 Projecting cross-sectional area
8 Cooling air flow
9 Main flow

What is claimed is:

1. A turbine blade of a gas turbine, the turbine blade including at least one cooling excavation which connects an interior and a surface of the turbine blade, wherein a mouth of the cooling excavation includes a protrusion in a downstream area thereof, the protrusion having a rounded cross-sectional area which projects into the mouth to impart a Coanda effect to a cooling air flow issuing from the mouth to increase adherence of the cooling air flow from the mouth to the surface of the blade.

2. A turbine blade in accordance with claim 1, wherein the protrusion extends along a part of a circumference of the mouth.

3. A turbine blade in accordance with claim 2, wherein the protrusion does not extend beyond the surface of the turbine blade.

4. A turbine blade in accordance with claim 2, wherein the protrusion is kidney-shaped.

5. A turbine blade in accordance with claim 4, wherein the protrusion does not extend beyond the surface of the turbine blade.

6. A turbine blade in accordance with claim 5, wherein the protrusion is made on the surface of the turbine blade.

7. A turbine blade in accordance with claim 4, wherein the protrusion extends beyond the surface of the turbine blade.

8. A turbine blade in accordance with claim 7, wherein the protrusion is made on the surface of the turbine blade.

9. A turbine blade in accordance with claim 4, wherein the protrusion does not extend beyond the surface of the turbine blade.

10. A turbine blade in accordance with claim 4, wherein the protrusion extends beyond the surface of the turbine blade.

11. A turbine blade in accordance with claim 4, wherein the protrusion is made on the surface of the turbine blade.

12. A turbine blade in accordance with claim 2, wherein the protrusion extends beyond the surface of the turbine blade.

13. A turbine blade in accordance with claim 1, wherein the protrusion is kidney-shaped.

14. A turbine blade in accordance with claim 1, wherein the protrusion does not extend beyond the surface of the turbine blade.

15. A turbine blade in accordance with claim 1, wherein the protrusion extends beyond the surface of the turbine blade.

16. A turbine blade in accordance with claim 1, wherein the protrusion is made on the surface of the turbine blade.

17. A turbine blade of a gas turbine, the turbine blade including at least one cooling excavation which connects an interior and a surface of the turbine blade, wherein a mouth of the cooling excavation includes a protrusion in a downstream area thereof, wherein the protrusion does not extend beyond the surface of the turbine blade.

18. A turbine blade in accordance with claim 17, wherein the protrusion is made on the surface of the turbine blade so as to impart a Coanda effect to a cooling air flow is issuing from the mouth.

* * * * *